Patented Apr. 21, 1931

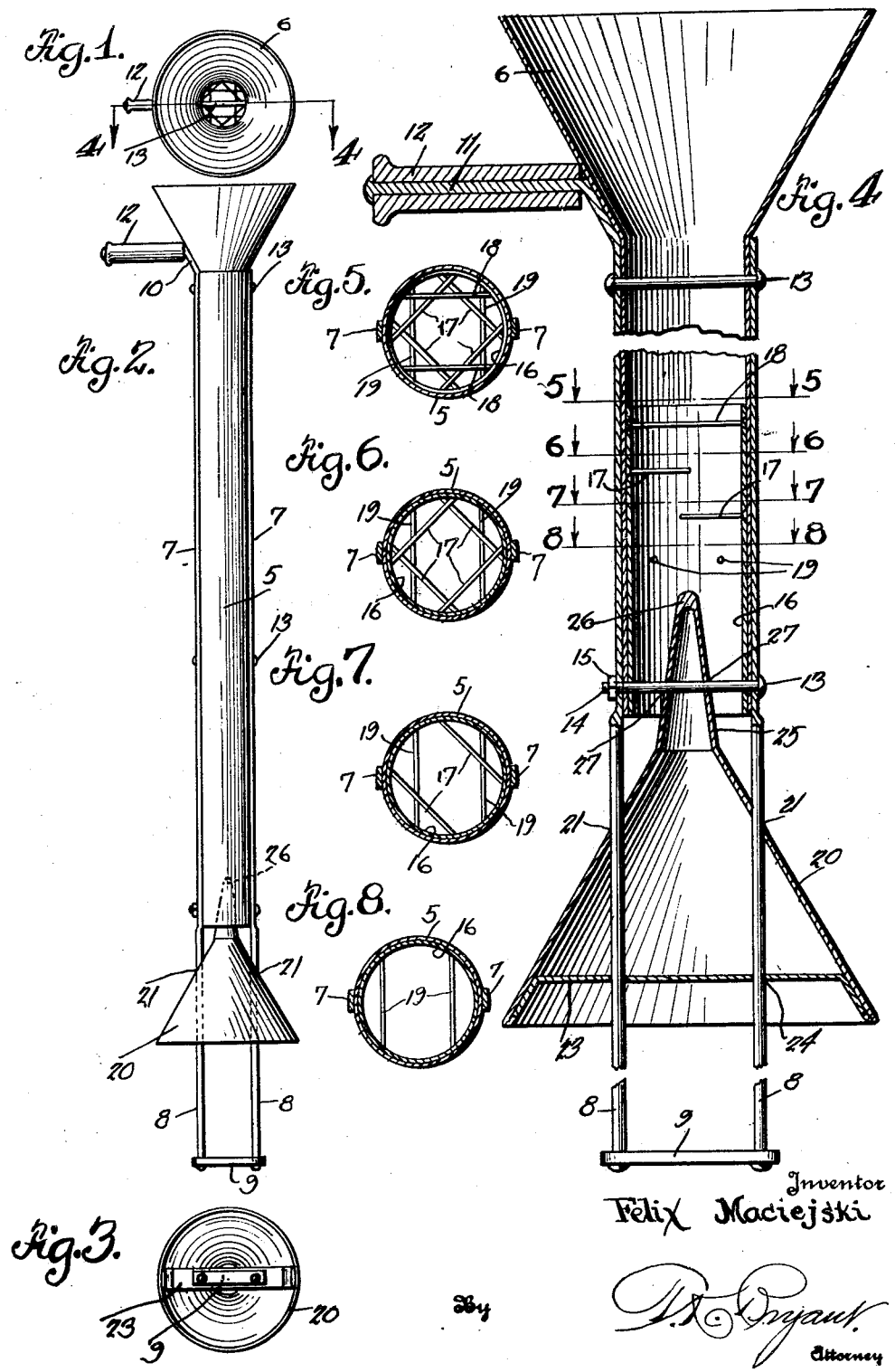

1,802,059

UNITED STATES PATENT OFFICE

FELIX MACIEJSKI, OF WILD ROSE, WISCONSIN

FERTILIZER DISTRIBUTOR

Application filed May 22, 1930. Serial No. 454,610.

This invention relates to improvements in fertilizer distributors of the portable hand type.

The primary object of this invention, is to provide a portable fertilizer and seed distributor adapted to be manually carried with ease and advantage for distributing seed and fertilizer and at the same time marking the spot or area in which the fertilizer or seed has been deposited.

A still further object of this invention is to provide a device of the above mentioned character having means for supporting a quantity of seeds or fertilizer and means therein for agitating the fertilizer prior to its distribution.

A still further object of this invention is to provide a device of the above mentioned character having a supporting foot at the lower end thereof whereby when a quantity of fertilizer or seed has been distributed in a certain area, a mark in the ground will be made to designate such distributed area.

A still further object of this invention is to provide a device of the above mentioned character which is easy in operation, simple in construction and having comparatively few parts to become out of order.

Other objects and advantages will become apparent during the course of the following description forming a part of this specification and in which, Figure 1 is a top elevational view of the invention illustrating the arrangement of the cross-wires in the fertilizer container or hopper for agitating the fertilizer before being distributed;

Figure 2 is a vertical side elevational view of the invention illustrating the arrangement of parts therein and particularly the seed hopper, distributor and marking chute;

Figure 3 is a bottom plan view of the invention further illustrating the arrangement and manner of attaching the marking foot;

Figure 4 is a vertical cross-sectional view taken on line 4—4 of Figure 1 showing the same enlarged and illustrating more clearly the interior arrangement of the agitator and the fertilizer distributor;

Figure 5 is a transverse cross-sectional view taken on line 5—5 of Figure 4 looking in the direction of the arrows and showing the cross wires extending transversely of the hopper tube for agitating the fertilizer or seed;

Figure 6 is a transverse cross-sectional view taken on line 6—6 of Figure 4 looking in the direction of the arrows, and illustrating a plurality of the transverse agitator wires mounted in the removable shell in the hopper tube;

Figure 7 is a transverse cross-sectional view taken on line 7—7 of Figure 4 only illustrating four of the transverse wires and their arrangement relative to the hopper tube; and Figure 8 is a transverse cross-sectional view taken on line 8—8 of Figure 4 looking in the direction of the arrows illustrating the bottom pair of transverse agitator wires.

In the drawings for the purpose of a detailed description, the reference character 5 will generally be employed to designate an elongated tube having both ends open and the upper end of the tube is formed into a funnel-shaped hopper 6 for receiving a quantity of fertilizer or seed material. The throat of the hopper or funnel-shaped member 6 is formed integral with the tube 5 whereby fertilizer material fed into the hopper 6 will pass downwardly through the tube 5 to the lowermost end thereof. Disposed longitudinally of the tube 5 and on each side thereof is a metallic strap 7 terminating at the lower end thereof in foot portions 8, the lowermost ends of which are connected by a plate 9 by reason of each of the feet 8 extending through an opening therein and being held rigidly thereto in any suitable manner. An extension 10 is formed on the upper end of one of the vertical longitudinal straps 7 and embraces the side wall of the funnel or hopper 6 and terminates in a shank 11 upon which is formed or secured a wooden handle 12. Each of the metallic straps 7 are adapted to be secured to the vertical tube 5 by means of transverse pins 13 which extend through the straps 7 and tube 5 as clearly illustrated in Figure 4. The lower holding pin 13 is formed with screw threads 14 for receiving the nuts 15 whereby the same may be removed for a purpose which will be described. The other holding pins 13 may have both of their ends flattened or riveted thereby making the same rigid or immovable.

Removably carried by the tube 5 is a tube 16 which fits internally of the tube 5 and in slidable relation thereto. This tube constitutes a carrier for a plurality of diagonally arranged agitator wires 17 which are mounted in a vertical spaced relation as illustrated in Figures 5 to 8 inclusive. It will be noted that the cross wires 17 form a rectangle as illustrated in Fig. 6 while the pairs of wires 18 and 19 mounted above and below the wires 17 also form a rectangle clearly illustrated in Figure 5, or in other words, the top and bottom pairs of transverse wires 18 and 19 respectively are positioned in the tube 16 at right angles to each other, while the central pairs of cross wires 17 are at right angles to each other but are not in alignment with the top and bottom pairs of cross wires 18 and 19 respectively. This peculiar arrangement affords the necessary agitation of the fertilizer material or seeds whereby the same will not become packed or clogged in the interior of the tube 5.

A cone-shaped member 20 is detachably carried by the lower end of the tube 5 by means of the lower pin 13 which may be removed for the removal of the cone-shaped member 20. A pair of opposite openings 21 are formed in the cone-shaped member 20 midway between the top and bottom and these openings are provided for receiving the extension feet 8 of the vertical side straps 7. A cross-strap 23 has its opposite end connected to the lowermost portion of the cone-shaped member whereby the lower end is spanned and a support is formed for preventing lateral movement of the cone member 20. The feet 8 also extend through openings 24 in the cross strap 23 as more clearly illustrated in detail in Figure 4. The ends of the cross strap 23 may be soldered or otherwise secured to the interior wall of the cone-shape member 20 or any suitable fastening means may be provided therefor. The upper end of the cone-shaped member 20 is elongated as at 25 and terminates in a point 26 which extends into the lowermost portion of the tube 5 for deflecting the material in the tube 5 during its downward travel. It is to be understood that the fertilizing material will engage the outer face of the cone 20 and be spread radially from the tube 5 in a manner which will be hereinafter fully described, during the description of the operation of the invention. The elongated tapered portion 25 formed on the upper end of the cone 20 may be provided with opposite apertures for receiving the lower pin 13 as at 27 for further supporting the cone shaped member 20.

For a consideration of the operation of the device, the handle 12 is grasped in the hand of the operator and an area is determined by the operator in which he desires to spread the fertilizing material or plant seed therewith. After deciding the area, the plate or shoe 9 which is connected to the foot extension 8 is placed into the ground in order to make a mark and whereby the device is held against movement laterally while the tube 5 is reciprocated by means of the handle 12, thereby causing the fertilizing material within the tube 5 and hopper 6 to be moved downwardly over the elongated extension 27 within the tube and also over the surface of the cone-shaped member 20 whereby the material such as fertilizer or the like is dispensed in a radial fashion. During the reciprocating motion of the tube 5 by means of the operator grasping the handle 12, the fertilizing material is agitated and prevented from packing by means of the cross agitator wires 17, 18 and 19 which are secured in the removable tube 16.

If it is desired to remove the tube 16, the lower pin 13 is removed by first unscrewing the nut 15 from the threaded end 14 of the pin 13 whereby the cone-shaped member 20 may be moved downwardly and the cylinder 16 or tube carrying the agitator wires may then be removed.

It is to be understood, that various changes in the shape, size and arrangement of parts may be resorted to without departing from the spirit of the invention or the scope of the sub-joined claims.

Having thus described the invention, what is claimed as new is:—

1. A fertilizer and feed distributor of the portable type, comprising an elongated tube having a funnel-shaped hopper at the upper end thereof, an operating handle also associated with the upper end of the elongated tube, a pair of strap irons secured to the outer side of the tube and extending parallel therewith, extensions formed on the lower end of the parallel straps, said extensions extending below the lower end of the elongated tube, a cross-piece connecting the lowermost ends of the extensions, a cone-shaped deflector carried by the extensions, and removable means carried in the interior of the tube for preventing packing of the material to be dispensed.

2. A fertilizer and feed distributor of the character described, comprising an elongated tube, a funnel-shaped hopper formed at the upper end of the tube, a pair of metal straps extending parallel with the metal tube and secured to the outer side thereof, extension feet formed on the lower end of each of the vertical straps, a cross piece at the lower end of the extensions, an angle extension formed on one of the vertical metallic straps, a handle secured to the extension, a cone-shaped deflector carried by the extensions of the parallel straps, and means carried within the elongated tube for preventing packing of the material to be distributed.

3. A fertilizer and feed distributor of the character described, comprising an elongated tube, a funnel-shaped hopper formed at the upper end of the tube, a pair of parallel metallic straps secured to the outer side of the elongated tube, extensions formed on the lower portion of each of the straps, said extensions extending beyond the lower opening of the elongated tube, a cross-piece for connecting the ends of the extensions, a handle carried by the upper end of one of the parallel extending metallic straps, a cone-shaped deflector having its pointed end extending into the lower end of the elongated tube, means associated with the cone-shaped deflector for being attached to the extension, and a removable tube carrying agitating means removably mounted in the interior of the elongated tube.

4. A fertilizer and feed distributor of the portable type, comprising an elongated tube having a funnel-shaped hopper at the upper end thereof, a pair of parallel extending metallic straps secured to the outer side of the elongated tube, extensions formed on each of the parallel metallic straps at the lower end thereof, a cross-piece for connecting the lower end of the extensions, a handle carried by the upper end of one of the parallel metallic straps, a cone-shaped deflector rigidly supported at the lower end of the elongated tube by means of the extensions of the parallel straps, said cone-shaped deflector having its pointed end extending upwardly and into the opening of the elongated tube, a removable cylinder carried within the elongated tube, and cross wires extending diagonally across the interior of the removable tube.

5. A portable feed and fertilizer distributor of the character described, comprising an elongated tube open at both ends, a funnel-shaped hopper rigidly attached to the upper end of the tube, a pair of parallel extending metallic straps secured to the outer side of the elongated tube, an extension foot formed on the lower end of each metallic strap, a cross bar connecting the lower ends of the extensions, a handle formed on the upper end of one of the parallel metallic straps, a cone-shaped deflector carried by the extension foot portions, a removable tube mounted concentrically within the elongated tube, and transverse agitating wires extending across the interior of the tube for preventing packing or jamming of the material fed from the hopper through the tube.

6. A portable feed and fertilizer distributor of the character described, comprising an elongated tube open at both ends, a funnel shaped hopper formed at the upper end of the tube, a pair of parallel extending metallic straps attached to the outer side of the elongated tube, a handle formed on one of the parallel metallic straps at the upper end thereof, foot extensions formed on each of the parallel extending straps for supporting the elongated tube while the device is in operation, a cross-piece connecting the lower ends of the foot extensions, a cone-shaped deflector having its pointed portions projecting into the lower opening of the elongated tube, said cone-shaped deflector being carried by the foot extensions, a securing pin passing through the lower end of the tube and through the upper end of the cone-shaped deflector for further supporting the same, a removable tube carried within the elongated tube, and agitating wires extending diagonally across the interior of the removable tube.

In testimony whereof I affix my signature.

FELIX MACIEJSKI.